United States Patent [19]
Conrad et al.

[11] 3,772,931
[45] Nov. 20, 1973

[54] SELF CENTERING PULLEY SYSTEM FOR THIN FILM MATERIAL

[75] Inventors: René Conrad, San Mateo; John Hohmann, Sunnyvale, both of Calif.

[73] Assignee: Dynaloc Corporation, San Mateo, Calif.

[22] Filed: Apr. 5, 1972

[21] Appl. No.: 241,153

Related U.S. Application Data

[63] Continuation-in-part of Ser. No. 95,105, Dec. 4, 1970, abandoned.

[52] U.S. Cl. .................................................. 74/240
[51] Int. Cl. ............................................. F16h 7/18
[58] Field of Search ............... 74/240, 241; 226/15; 198/202

[56] References Cited
UNITED STATES PATENTS
| | | | |
|---|---|---|---|
| 2,622,448 | 12/1952 | Lorig | 74/241 |
| 3,243,978 | 4/1966 | Gowin | 226/15 X |

FOREIGN PATENTS OR APPLICATIONS
| | | | |
|---|---|---|---|
| 155,354 | 5/1952 | Australia | 198/202 |
| 698,648 | 9/1953 | Great Britain | 198/202 |

*Primary Examiner*—Leonard H. Gerin
*Attorney*—Hamrick & Schatzel

[57] ABSTRACT

For endless belting of thin film material having characteristic fabricational twists causing sidewise creeping and wrinkling of such material relative to a pair of pulleys crowned toward center and each having a surface configuration for 180° wrap around engagement to afford alternately opposite inwardly and outwardly tending crosswise forces to such belting and the tensioning of the latter at one edge by an unparallel adjustment between the pulleys to compensate for the creep creating twist in such belting and for smoothing the latter widthwise transversely of the direction of movement thereof over the pulleys.

2 Claims, 7 Drawing Figures

PATENTED NOV 20 1973 3,772,931

SELF CENTERING PULLEY SYSTEM FOR THIN FILM MATERIAL

This invention relates to a closed loop system of pulleys and rollers for tracking and aligning webbing and more particularly to a system of pulleys and rollers for creating self centering and smoothing action to webbing of thin film, flexible material relative thereto. This application is a continuation in part of our application Ser. No. 95,105, filed in the United States Patent Office on Dec. 4, 1970 and now abandoned. This application also relates to our co-pending application Ser. No. 83,808, now U.S. Pat. No. 3,624,568, filed in the United States Patent Office on or about Sept. 27, 1971 for Centerline Tracking Rollers For Closed Loop Systems.

BACKGROUND

Heretofore the problem of tracking and aligning webbing or strip like material on rollers or pulleys has been a universal problem. Crowned or tapered rollers have been employed in an attempt to prevent belting from running sidewise. Wormed surface rollers have also been applied with either inwardly and/or outwardly tending spiral ridges or grooves for centering and/or stretching the web material relative to the rollers. More recently idler rollers have been provided with rubber discs or hollow rubber cylindrical walls having angularly depressed voids between peripheral lands for yielding to excessive loads on the belting to influence tracking of the latter toward center.

STATEMENT OF INVENTION

The present invention contemplates the provision of rollers or pulleys affording the combined action of spreading and smoothing out thin filmed, wrinkleable material during tracking and centering thereof relative to such rollers and pulleys.

Thin materials such as fine woven thread, fiberglas and wire, paper, pulp, felt and screening, as well as synthetic plastic film, screening or their flexible metallics such as foil and the like are most difficult to track and center on closed belt systems. This is so mainly because of fabricational twists in the strands of such thin film material causing sidewise creeping and a tendency to wrinkle more readily than would occur in normal type belting.

Such thin film material is not normally utilized as a conveyor type belting but rather is pulley trained for light loads and/or incident to treatment such as coating and/or processing of the belting during manufacture thereof. Due to the non-rigid characteristics of such thin film material it has a greater tendancy to yield to pressures afforded by the tensioning and the centering influence of spiral ribbed and/or grooved rollers. Consequently, there is a greater tendancy toward wrinkling especially in wide widths of such thin film materials when stretched over tracking, centering and aligning type pulleys and/or rollers so hereto provided.

With the foregoing in mind it is an object of the present invention to provide a combination of in centerline tracking rollers having a web engaging surface configurated to enhance the centering influence without unduely creating wrinkling of thin film material type webbing. In this connection it is a further object to provide such rollers with a web engaging surface assuring non-wrinkling thereof while applying a centerline tracking action thereto.

Accordingly it is an object of this invention to provide a combination of centerline tracking rollers having a surface of firm spirally tending belt centering lands interspersed with intermediate angular depressions adapted to simultaneously influence movement of thin film webbing in a direction parallel to the axis of such rollers during the centering action.

It is another object of this invention to provide thin film web centerline tracking rollers having a cylindrical surface tapered toward center, midway the length thereof with spirally tending web engaging lands between intermediate angular depressed lands into which such thin film webbing may stretch so as to influence accumulative crosswise movement of such webbing transverse to the direction of movement thereof lengthwise of such webbing passing over such rollers.

It is yet another object to provide in a closed loop system of such thin film webbing trained over driving and idler rollers a surface configuration on the latter so constituted as to maintain in a centered tracking action combined with a web spreading action.

These and other objects of the present invention will become apparent from a reading of the following description and claims in the light of the accompanying single sheet of drawing in which:

GENERAL DESCRIPTION

Figure 1:
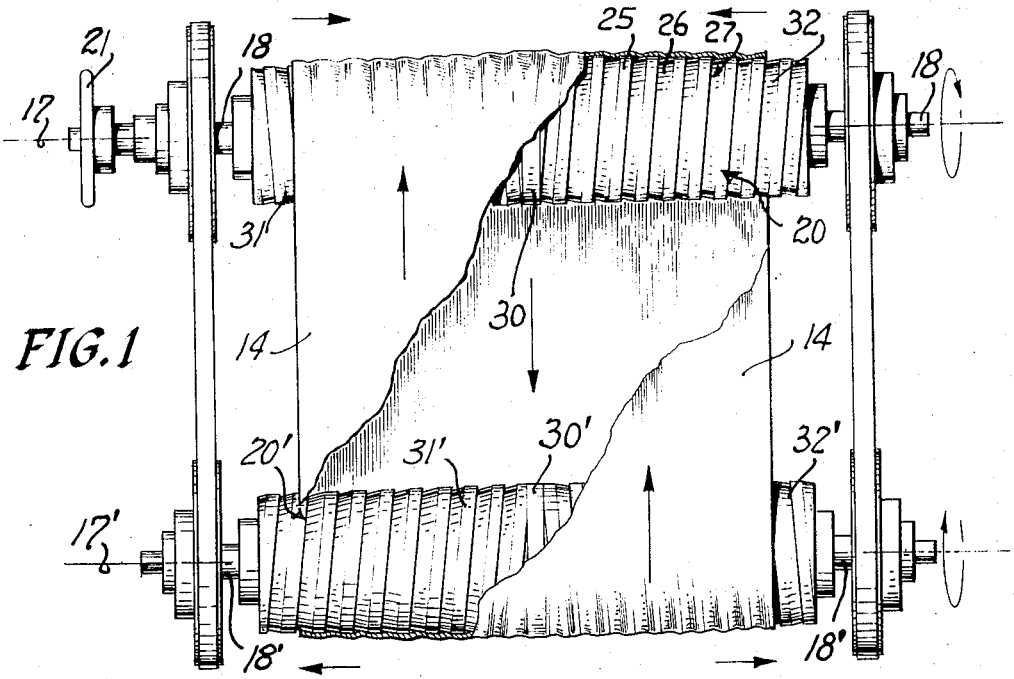
FIG. 1 is a plan view closed loop system for thin film webbing showing centerline tracking rollers constructed in accordance with the embodiment of the present invention.
Figures 6, 7:
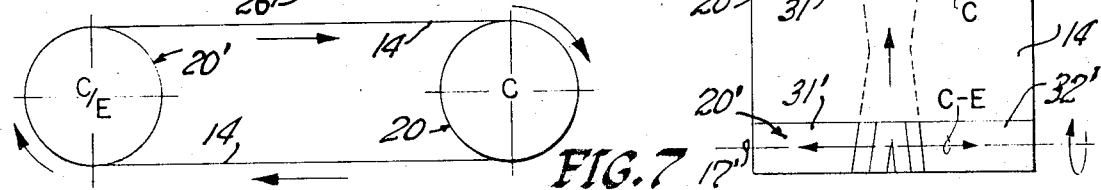
FIG. 6 is a diagrammatical illustration of the closed loop system of FIG. 1 showing the directional influence of the rollers of the present invention upon the webbing.
FIG. 7 is a diagram along longitudinal center of the closed loop system of FIG. 1.

Referring to FIGS. 1, 6 and 7 a closed loop system of belting 14 is shown to generally include a frame supporting a pair of rollers 20—20' on shafts 18—18 journalled for rotation on substantially parallel axes 17—17', respectively. One shaft 18 has a drive sprocket or pulley 21 secured to one of its ends for driving connection in a conventional manner to a source of motivating power (not shown). The roller 20 is considered a drive roller and the roller 20', and idler roller. In either case the webbing is shown to have a total of 180° wrap around contact with the surface of each roller 20 and 20'. Moreover, each roller is shown to have a slight taper from center (midway its length) toward its ends which are of lesser diameter to assure pulley crowning in the usual manner.

The axial centers 17—17' of the shafts 18—18', respectively, may be initially adjusted out of parallelism slightly depended upon the warp and weave of the thin film material webbing to compensate for any differences in loop dimension at the side edges thereof. Once the webbing 14 is mounted on the rollers 20—20' at a proper tension determined by the characteristics of the delicate thin film material, the remainder of the centering, aligning and tracking of the webbing is determined by the influence of the surface contact between the latter and the rollers 20 and 20' as will now be explained.

DETAILED DESCRIPTION OF THE INVENTION

Referring to FIGS. 1 through 5 of the drawing each roller 20 and 20' is provided with a surface configuration the characteristics of which include the principle and function of operation forming the embodiment of the present invention. Basicaly this involves the action of annularly formed, spirally tending lands 25 in the belt engaging surface S of the rollers which lands are uniformly spaced along the length of each roller combined with the action of angularly disposed faces 26 formed in depressions or voids 27 between the lands 25 of the roller surface S.

The rollers 20 and 20' are preferably tapered from crown center 30 at a crown band 28 midway their ends and have their lands 25 pitching spirally in opposite directions relative to the centrally located crown band 28.

The angularly disposed faces 26 within the voids or depressions 27 are pitched inwardly toward or outwardly from crown center 30 dependent upon the directional influence to be impressed thereby upon the thin film webbing 14. It has been found the best operative results are obtained when the spacing between lands 25 is approximately 3 to 4 times the width of the land.

Figures 2, 3:
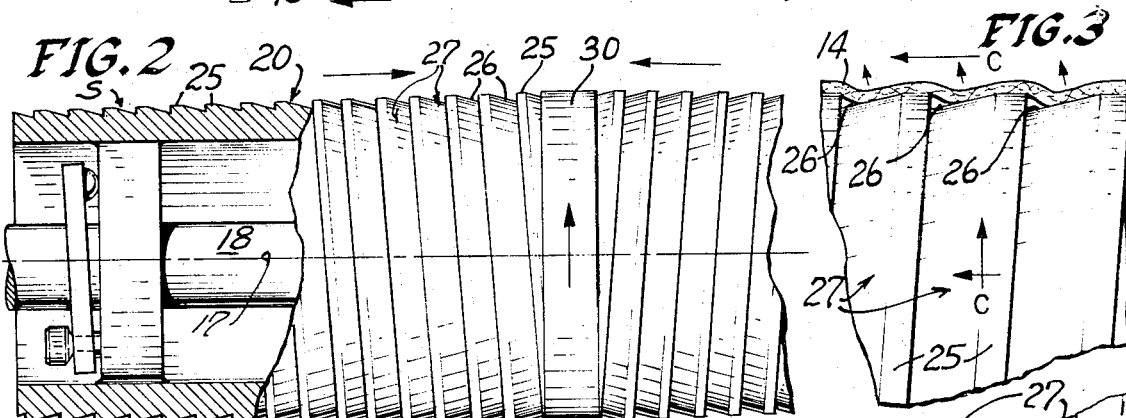
FIG. 2 is a fragmentary elevation of the web driving roller of FIG. 1 at enlarged scale and partly broken away for purpose of illustration.
FIG. 3 is a fragmentary enlargement of a portion of the right-hand end of such roller of FIGS. 1 and 2 with an illustration of the influence thereof on thin film webbing shown in section.

In the case of the driver roller 20 the lands 25 are shown to spirally tend outwardly from crown center 30 on the respective left-hand and right-hand end 31 and 32, respectively, of the roller surface S. As depicted in FIGS. 1, 2 and 3 the direction of rotation of the roller 20 is upwardly and over in these views, in contact with 180° of the roller surface S. Thus it will be noted that the spirally tending lands 25 turn screw fashion inwardly and toward center on each end 31 and 32 of the roller 20. In combination therewith the angular faces 26 between the lands 25 decline from each land inwardly toward the next of centermost adjacent land. In other words, the faces 26 pitch inwardly toward crown center 30 of the roller 20.

By this arrangement the entire surface of the delicate thin film webbing 14 is not fully engaged with surface S of the roller 20 but just enough to achieve positive drive therefrom. This surface contact of the inwardly tending lands 25 lightly influences the thin film webbing 14 in screw fashion to urge the latter uniformly inward from each end toward center 30 of the roller. This is enhanced by the combined action of the intermediate depressions 27 upon the thin film webbing 14. As illustrated in FIG. 3, the thin film 14 flexes into the depression 27 and this tends to apply an inward thrust slanted in the direction of the decline in the angular surfaces 26 between the lands 25. The spirally tending lands 25 are thus assisted in causing the thin film webbing 14 stretched over the drive roller 20 to be uniformly urged toward center crown 30.

Figures 4, 5:
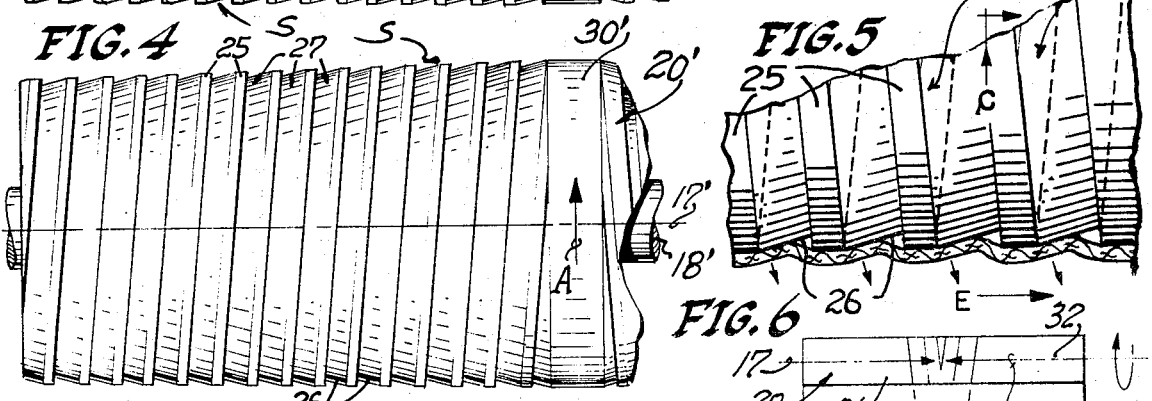
FIG. 4 is a fragmentary elevation of the other or idler roller of FIG. 1 at enlarged scale.
FIG. 5 is a fragmentary enlargement of a portion of the right-hand end of such roller of FIGS. 1 and 4 with an illustration of the influence thereof on thin film webbing shown in section.

Referring now to the idler roller 20' the action is similar but in reverse, i.e., a spreading action is applied to the thin film webbing 14 as centered by the drive roller 20. As best seen In FIGS. 4 and 5 the idler roller 20' has a crown center 30' midway its end portions 31' and 32'. In FIG. 4 the lands 25' are shown to be spirally tending outwardly from the center crown 30' as the roller 20' turns over in the direction of the arrow A thereon. The angular faces 26' in each intermediate depression 27' between lands 25' decline outwardly from center on and toward the left and right-hand ends 31' and 32', respectively, of the roller 20'. From the illustration in FIG. 5 it will be noted that the outfall of each angular face 26' cooperates with the outwardly tending screw-like action of the lands 25' to stretch the thin film webbing outwardly from center 30' on each end 31' and 32' of the idler roller 20'. In this manner the thin film webbing 14 is smoothed out; wrinkle free, relative to the roller 20' while being maintained centered thereon.

By the foregoing arrangement thin film webbing which tend to wrinkle when rolling over crowned type pulleys is caused to flex inwardly or outwardly, as the case may be, depending upon the angular disposition of the angular faces in the depressions between helical lands of the roller surface. Such thin film material is difficult to track because it does not have horizontal strength. For this reason the tension on the webbing cannot be made too great requiring an assist from the tendancy of the thin material to flex into the interspersed depressions between the lands.

In the case of extremely delicate material such as pulp, the roller surface configurated according to the present invention may be provided with a cladding to minimize tearing and/or marring of the thin film material at the drop off points between the lands 25'.

Having thus described the novel features provided by the surface configuration of the rollers for tracking and centering thin film wrinkleable material in accordance with the present invention what we claim and desire to protect by Letters Patent is expressed in the appended claims.

What is claimed is:

1. In a closed loop system of thin film, flexible, wrinkleable material trained over a set of rollers including a drive roller and idler roller axially adjusted to compensate for dimensional deviations caused by the characteristics of such thin film material, and wherein the material has at least 180° wrap-around engagement with the drive roller and the idler roller, an improved drive roller and idler roller combination comprising:
   a drive roller having a web engaging surface including a central band disposed intermediate the ends of the roller, oppositely directed spirally tending lands spiralling inwardly from each end of the roller toward the central band, and angularly disposed, depressed faces formed between adjacent lands, said faces declining inwardly toward said central band; and
   an idler roller having a web engaging surface including a central band disposed intermediate the ends of the roller, oppositely directed, spirally tending lands spiralling outwardly from the central band to the ends of the roller, and angularly disposed depressed faces formed between adjacent lands, said faces declining outwardly toward the ends of the roller.

2. In a closed loop system as recited in claim 1 wherein the web engaging surfaces of said rollers taper from said central bands toward the opposite ends of said rollers to form crowned rollers.

* * * * *